US012689674B1

(12) United States Patent
Pauga et al.

(10) Patent No.: US 12,689,674 B1
(45) Date of Patent: Jul. 21, 2026

(54) EDGE COMPUTING INITIALIZATION KIT

(71) Applicant: ClearObject Corporation, Fishers, IN (US)

(72) Inventors: Craig Pauga, Indianapolis, IN (US); Derek Bleyle, Cicero, IN (US); Chase Weaver, Fishers, IN (US); Aaron Nall, Fishers, IN (US)

(73) Assignee: ClearObject Corporation, Fishers, IN (US)

( * ) Notice: Subject to any disclaimer, the term of this patent is extended or adjusted under 35 U.S.C. 154(b) by 54 days.

(21) Appl. No.: 18/967,835

(22) Filed: Dec. 4, 2024

Related U.S. Application Data

(60) Provisional application No. 63/607,789, filed on Dec. 8, 2023.

(51) Int. Cl.
*H04L 67/12* (2022.01)
*H04L 67/10* (2022.01)

(52) U.S. Cl.
CPC .............. *H04L 67/12* (2013.01); *H04L 67/10* (2013.01)

(58) Field of Classification Search
CPC ....................................................... H04L 67/12
See application file for complete search history.

(56) References Cited

U.S. PATENT DOCUMENTS

| | | | | |
|---|---|---|---|---|
| 2020/0380306 A1* | 12/2020 | Hada | .................... | G06N 3/0495 |
| 2021/0042532 A1* | 2/2021 | Latapie | ................. | G06V 40/10 |
| 2022/0351061 A1* | 11/2022 | Baldwin | ................ | G06N 5/046 |
| 2023/0244996 A1* | 8/2023 | Kumar | .................. | G06N 20/00 |
| | | | | 706/12 |

* cited by examiner

*Primary Examiner* — Hee Soo Kim
(74) *Attorney, Agent, or Firm* — Thomas Joseph; OGC Law, LLC

(57) ABSTRACT

A sensing device has a sensor. An edge device that has a processor and memory receives a data stream from the sensor. A communication device connects the edge device to a cloud computing system over a network for processing the data stream and for sending the processed data stream to the cloud computing system. The memory includes instructions for execution by the processor to deploy an inference engine using a pipeline. A capture module receives and stores the data stream within the memory. A pre-processing module modifies the data stream in the memory to compensate for defects contained therein, thereby forming a modified data stream. A deep learning module identifies inferences within the modified data stream, trains a model based upon the inferences, and combines the modified data stream, the model, and the inferences to form the processed data stream. A logging module stores the processed data stream.

20 Claims, 6 Drawing Sheets

200

LAYERED VIDEO FEED  210

216

LABEL

218

BOUNDING BOX  220

OBJECT

222

212

TIME

214

LOCATION

224

GRAPHIC INTERFACE  226

VIDEO FEED  228

DEVICE STATUS BOX  232

DEVICE DETAILS BOX  230

SENSOR MEASUREMENT CHART  234

SENSOR MEASUREMENT CHART  236

SENSOR MEASUREMENT CHART  238

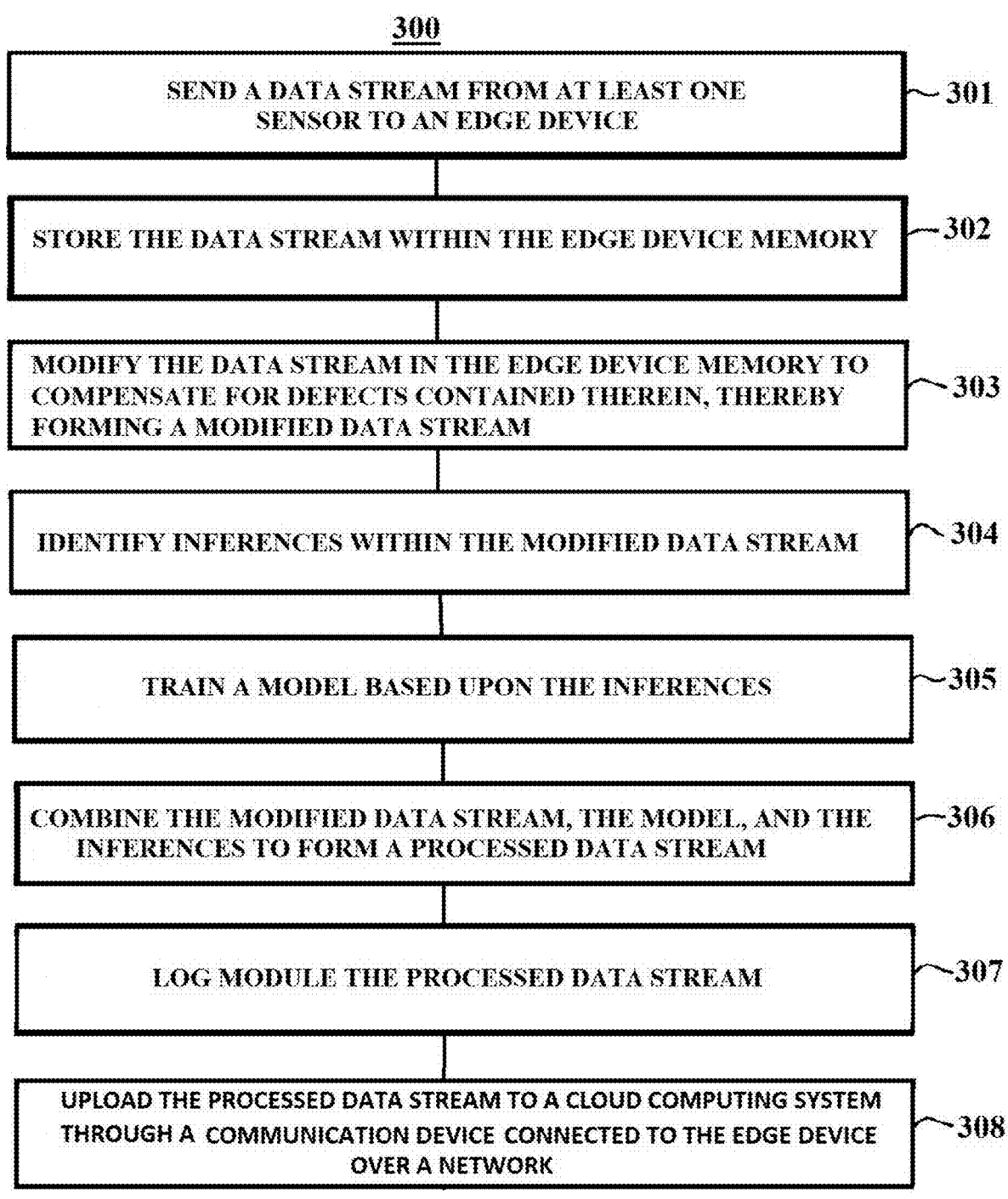

300

SEND A DATA STREAM FROM AT LEAST ONE SENSOR TO AN EDGE DEVICE — 301

STORE THE DATA STREAM WITHIN THE EDGE DEVICE MEMORY — 302

MODIFY THE DATA STREAM IN THE EDGE DEVICE MEMORY TO COMPENSATE FOR DEFECTS CONTAINED THEREIN, THEREBY FORMING A MODIFIED DATA STREAM — 303

IDENTIFY INFERENCES WITHIN THE MODIFIED DATA STREAM — 304

TRAIN A MODEL BASED UPON THE INFERENCES — 305

COMBINE THE MODIFIED DATA STREAM, THE MODEL, AND THE INFERENCES TO FORM A PROCESSED DATA STREAM — 306

LOG MODULE THE PROCESSED DATA STREAM — 307

UPLOAD THE PROCESSED DATA STREAM TO A CLOUD COMPUTING SYSTEM THROUGH A COMMUNICATION DEVICE CONNECTED TO THE EDGE DEVICE OVER A NETWORK — 308

FIG. 6

EDGE COMPUTING INITIALIZATION KIT

CROSS REFERENCE TO RELATED APPLICATION

This application claims the benefit under 35 U.S.C. § 119(e) of U.S. Provisional Application No. 63/607,789 entitled "EDGE COMPUTING INITIALIZATION KIT" filed Dec. 8, 2023, which is incorporated herein by reference.

BACKGROUND

The rapid development of AI-based visual inspection has made it possible to implement optical inspection systems that utilize deep learning and computer vision. These systems can monitor and inspect manufacturing or service operations automatically to ensure that products meet predetermined specifications.

Deep learning technology is becoming more and more popular for use in various industries. Its primary benefit is allowing machines to learn by example rather than explicitly program. Doing this makes it a powerful tool for tasks that are difficult to automate, such as visual inspection.

The basic principle of deep learning is to teach a machine to recognize specific patterns by providing a neural network with labeled examples. Once the device has learned those patterns, it can apply them to new data to identify the defects.

Integrating deep learning algorithms with automated visual inspection technology allows discriminating components, abnormalities, and characters, simulating a human visual examination while running a computerized system. However, the integration of such algorithms and technology can require substantial time and effort, so that there is a need for improved systems and methods for implementing AI-based inspection technology.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, an edge computing initialization kit enables the processing of sensor data. A sensing device has at least one sensor. An edge device receives a data stream from the at least one sensor with the edge device having a processor and memory thereon. A communication device connects the edge device to a cloud computing system over a network, so that the edge device can process the data stream and send the processed data stream to the cloud computing system. The edge device memory includes instructions for execution by the edge device processor to deploy an inference engine using a pipeline. A capture module receives the data stream and storing the data stream within the edge device memory. A pre-processing module modifies the data stream in the edge device memory to compensate for defects contained therein, thereby forming a modified data stream. A deep learning module identifies inferences within the modified data stream, trains a model based upon the inferences, and combines the modified data stream, the model, and the inferences to form the processed data stream. A logging module stores the processed data stream.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 6 illustrates an exemplary method in accordance with this disclosure.

DETAILED DESCRIPTION

Figure 1:
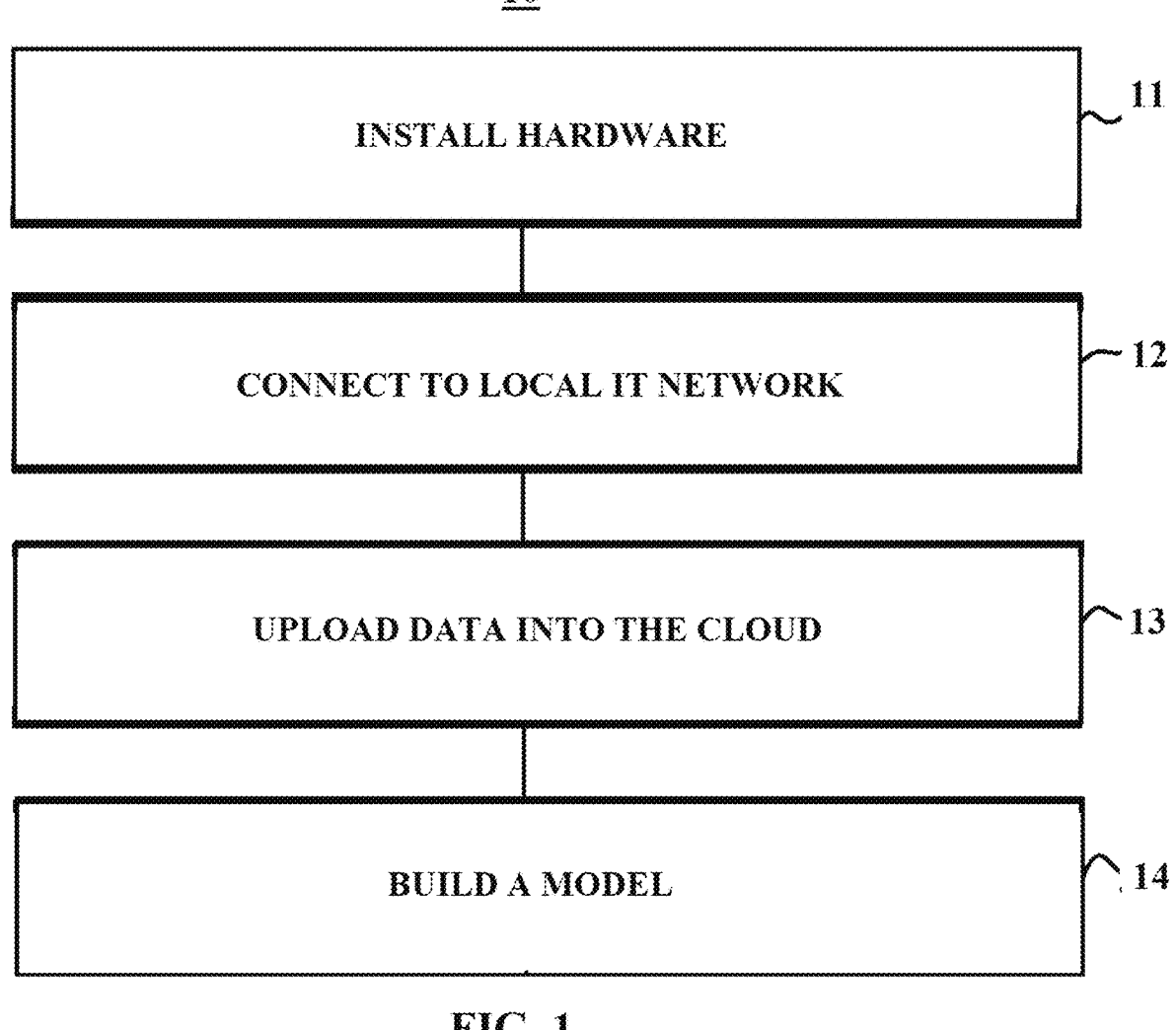
FIG. 1 illustrates an exemplary method in accordance with this disclosure.

The subject disclosure is directed to a kit that can be used within a system that provides for the rapid installation and implementation of an AI-based visual inspection system. The system can be used to monitor various industrial and commercial processes to identify inferences about such processes. The kit can be used to streamline the installation of the system to build models relating to the process rapidly.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

References to a "module", "a software module", and the like, indicate a software component or part of a program, an application, and/or an app that contains one or more routines. One or more independently modules can comprise a program, an application, and/or an app.

References to an "app", an "application", and a "software application" shall refer to a computer program or group of programs designed for end users. The terms shall encompass standalone applications, thin client applications, thick client applications, web-based applications, such as a browser, and other similar applications.

References to "artificial intelligence" and/or "AI" shall refer to artificial intelligence components and/or machine learning components of computer systems and/or computing devices. The artificial intelligence components can emulate human thought and perform tasks in a real-world environment, namely identifying patterns, making decisions, and improving operations through experience and data. The artificial intelligence components can use deep learning, neural networks, computer vision, and natural language processing. The artificial intelligence components utilize trained models that can be built by reviewing substantial volumes of sensor data, such as video feeds.

References to "deep learning model" shall refer to a trained neural network that is the heart of the processing being done.

References to "inference" or "inferences" shall refer to the process of obtaining an insight using a deep learning model. Some of the standards include segmentation, classification, and object detection.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Referring to the drawings and, in particular, to FIG. 1, an exemplary method, generally designated by the numeral 10, for implementing an AI-based visual inspection system is shown. The process 10 can be utilized to implement commercial, off the shelf hardware for monitoring an industrial or commercial process.

At Step 11, the hardware is installed at a facility within a sufficient proximity of the industrial or commercial process for one or more sensing devices to monitor the industrial or commercial process. The sensing devices are mounted within a housing, so that they can be placed in proximity to the process, be connected to the surrounding infrastructure, and be ready to obtain data shortly thereafter.

At Step 12, the hardware is connected to a local Information Technology (IT) network, so that the data can be transmitted to a computing device for analysis and/or visualization. The IT network can be utilized to facility uploading of the data to a cloud computing system at Step 13. Then, the computing device can start building a model at Step 14.

In this exemplary embodiment, the hardware includes one or more edge devices that includes an inference engine. The edge devices provide more intelligence and computing power with advanced services at the network edge. The inference engine can be used to obtain inferences and build models faster than existing AI-based visual inspection systems.

An edge device is any piece of hardware that controls data flow at the boundary between two networks. Edge devices fulfill a variety of roles, depending on what type of device they are, but they essentially serve as network entry—or exit—points. Some common functions of edge devices are the transmission, routing, processing, monitoring, filtering, translation and storage of data passing between networks. Edge devices are used by enterprises and service providers.

Edge devices can be configured to implement machine learning techniques to improve their operation and/or the edge data they generate. In particular, an edge device can build or utilize a model from a training set of input observations, to make a data-driven prediction rather than following strictly static program instructions. For example, a camera device can utilize deep learning models to learn to detect certain objects and capture images of those objects when detected. The ability to recognize similar objects can improve with machine learning as the camera device processes more images of objects. Since edge computing is a new field, there is a need for an improved system that utilizes one or more edge devices with enhanced video analysis capability.

In some embodiments, the edge device can perform post-processing, which is the process of taking the output of the inference process and applying data transformations that can provide signals of interest to a Programmable Logic Controller (PLC).

Figure 2:
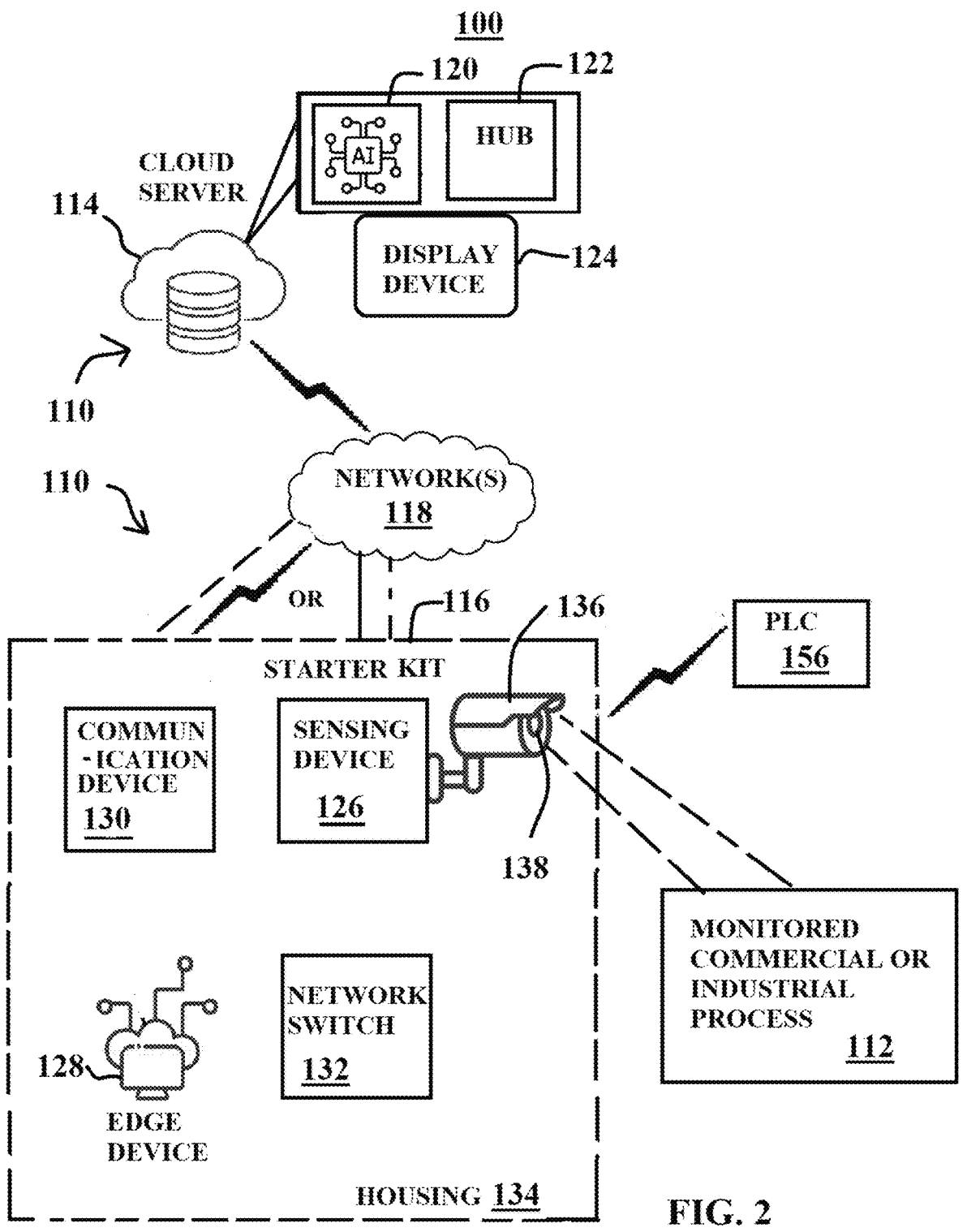
FIG. 2 is a schematic diagram of an exemplary edge computing apparatus that utilizes an edge computing initialization kit in accordance with this disclosure.
Figure 3:
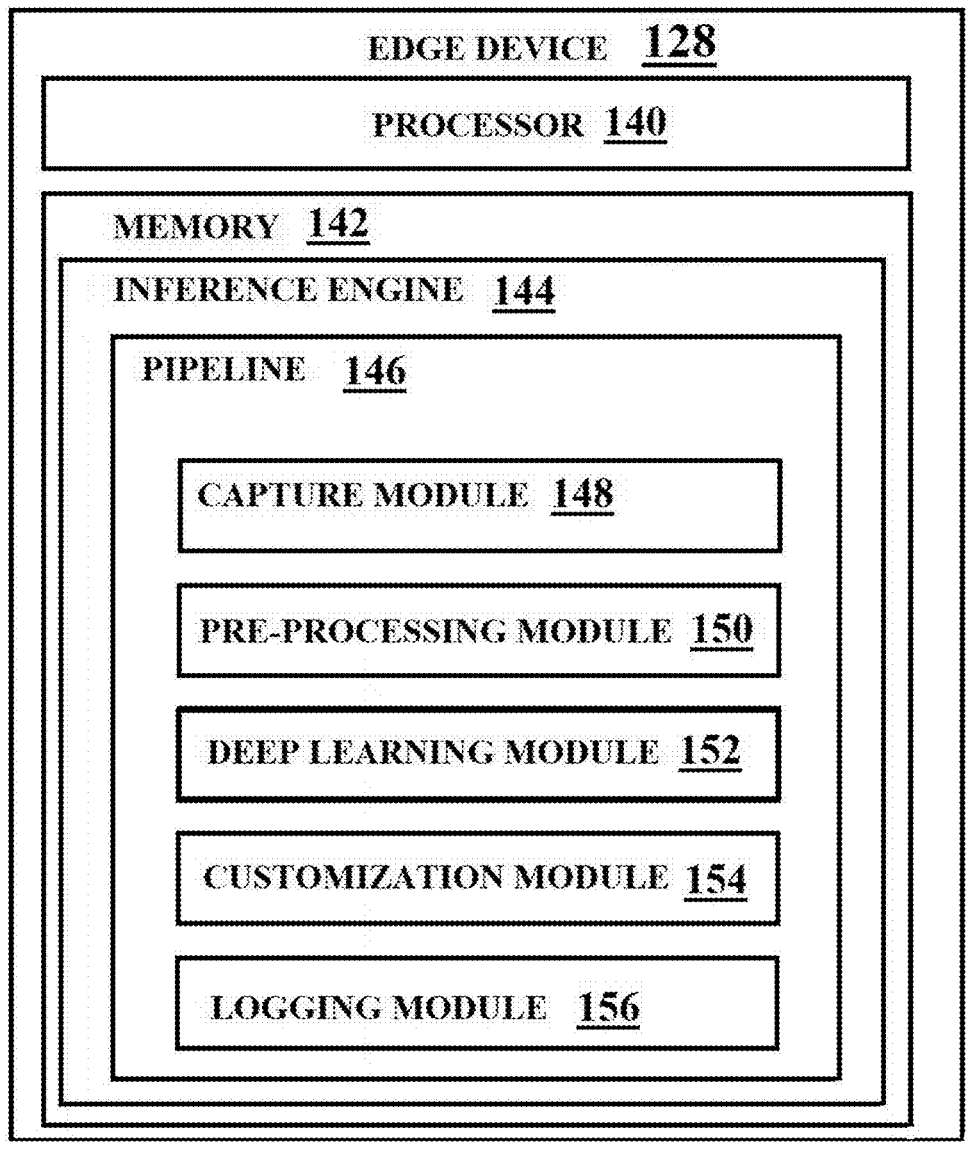
FIG. 3 is a block diagram of an exemplary edge device in accordance with this disclosure.

Referring now to FIGS. 2-3 with continuing reference to the foregoing figure, an exemplary operating environment, generally designated by the numeral 100, is shown. The operating environment 100 can include an apparatus 110 for monitoring an industrial or commercial process 112, such as a pipe inspection process, an industrial manufacturing process or a process implemented within the service sector, such a restaurant or grocery store.

The apparatus 110 can include a cloud computing system or server 114, a network 116, and a starter kit 118 for facilitating the rapid installation of the hardware and software that is necessary to monitor the process 112. The cloud server 114 can include one or more artificial intelligence components 120 and a visualization hub 122. The network 116 can be an in-house IT network, an external network, or any other suitable network that can connect or couple the server 114 to the starter kit 118.

The visualization hub 122 can be used visualize data, inferences, and other related data on a display device 124. The display device 124 can be a part of any type of computing device, including a smartphone, a handheld computer, a tablet, a PC, or any other computing device, that facilitates the display of computer generated output.

As shown in FIG. 2, the starter kit 118 can be an edge computing initialization kit that enables the processing of sensor data. The kit 118 can include a sensing device 126, an edge device 128, a communication device 130, and a network switch 132. One or more of the components of the kit 118 can be mounted within a housing 134.

The network switch 132 can connect the edge device 128 to the communication device 130. The communication device 130 can connect the edge device 128 to the cloud server 114 over the network 116, so that the edge device 128 can process a data stream and send the processed data stream to the cloud server 114. As shown in FIG. 2, the communication device 130 can connect to the network 116 through a wireless connection and/or a wired connection.

The sensing device 126 can include one or more sensors 136. The sensors 136 can be any suitable sensing mechanism that produces an output signal for the purpose of sensing a physical phenomenon within the process 112. The sensors 136 can be mechanisms, modules, machines, or subsystems that detect events or changes within the process 112 and sends the information to the edge device 128. In this exemplary embodiment, the sensors 136 are cameras that include one or more lenses 138. The cameras can be security cameras, machine vision camera, or other suitable cameras.

The sensors 136 can obtain a plurality of images as part of a visual inspection routine. The sensors 136 can facilitate monitoring of the process 112 on the display device 124 through the viewing a video stream produced from sensor output. The edge device 128 and/or the visualization hub 122 can be utilized to perform image processing operations on the video stream. The edge device 128 can embed one or more data layers into the video that relate to the feedback in real-time and/or near real-time.

The data layers can include indicators that relate to video quality or to objects that are acted upon as part of the process 112 or conditions of the process 112. The edge device 128 can add indicators visual indicators to video stream to draw attention to factors that affect the quality of the inspection video with the intention of assisting and/or training the system operators to produce improved work product.

Further, it should be understood that, in other embodiments, the sensors 136 can include a "light detection and ranging" or "laser imaging, detection, and ranging" imaging capabilities, sonar measurement capabilities, laser data capabilities, hydrogen sulfide sensor capability, non-RGB imaging capabilities, and other similar imaging and measurement capabilities. Additionally, the sensors 136 can have measurement capabilities to detect physical properties, chemical properties, radiation, and/or structural characteristics.

As shown in FIG. 3, the edge device 128 can include a processor 140 and memory 142. Memory 142 includes instructions for execution by the processor 140 to deploy an inference engine 144 using a pipeline 146. The inference engine 144 can be an end-to-end vision analytics solution that provides all necessary components to run a real-time vision system that includes components for deep learning, analyzing input sources, post-processing, logging, and other functions.

The inference engine 144 and the pipeline 146 can include a capture module 146, a pre-processing module 148, a deep learning module 150, a customization module 152, and a logging module 154.

The capture module 146 can receive a data stream from the sensor 136 through the coupling of the sensing device 126 to the edge device 128. The capture module 146 stores the data stream in memory 142. In some embodiments, the capture module 146 can capture data streams or video streams from indirect sources, such as image files, as opposed to a live or near-live data stream or video stream.

The pre-processing module 148 can review the data stream that was captured by the capture module 146 and stored in memory 142. The pre-processing module 142 can modify the data stream to compensate for defects contained to form a modified data stream. When the data stream is a video stream, the pre-processing module 142 can perform image analysis operations on the video stream.

The deep learning module 150 can identify inferences within the modified data stream. The inferences can be used to train a model, which can reside in memory 142. The model can be produced through one or more machine learning or artificial intelligence applications. In some embodiments, the applications can be implemented through a closed-source library.

In some embodiments, the model can be an Open Neural Network Exchange (ONNX) format model or an Engine (TensorRT) format model. The model can produce inferences as output. The model can be a video quality model, a defect detection model, a combination of a video quality model and a defect detection model, or other similar model. The deep learning module 150 can combine the modified data stream, the model, and the inferences to form a processed data stream.

In some embodiments, the deep learning module 150 can utilize augmentation to identify inferences within the modified data stream and to train the model. In other embodiments, the deep learning module 150 can utilize segmentation to identify inferences within the modified data stream and to train the model.

The customization module 152 can add data layers to the data stream. The customization module 152 can identify defects, generate labels, and/or generate inferences. can produce one or more indicators relating to the identified defects, labels, and inferences. The indicators can be embedded into the video in real-time or near real-time, as part of one or more data layers to produce a layered video stream. In some embodiments, the indicators can be video quality indicators.

The logging module 154 can store the processed data stream with annotations in memory 142. The logging module 154 can obtain aggregated results from the deep learning module 150 and/or the customization module 152 that may or may not be presented to an end user but rather packaged with the delivery file accompanying the inspection as meta data. This metadata can be used in later analysis phases and is stored in memory 142.

As shown in FIG. 2, the kit 118 can be coupled to a PLC 156 that can control the process 112. The kit 118 can send inferences and other information to the PLC 156 through the edge device 128.

Figures 4, 5:
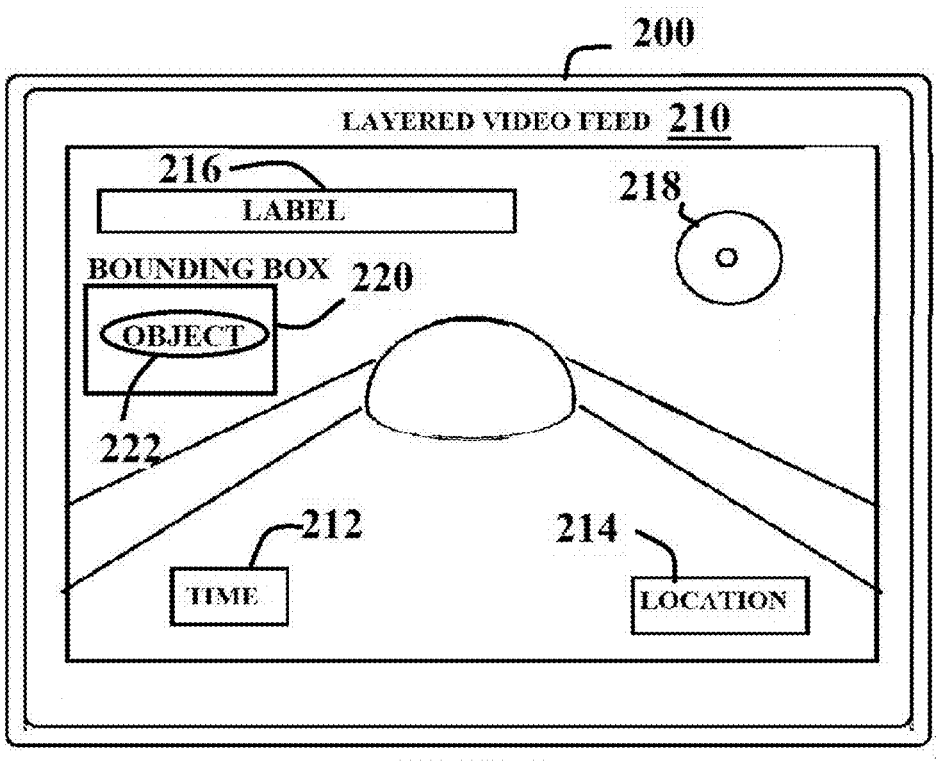
FIG. 4 illustrates an exemplary interface in accordance with this disclosure.
FIG. 5 illustrates another exemplary interface in accordance with this disclosure.

Referring to FIGS. 4-5 with continuing reference to the foregoing figures, exemplary output for various embodiments of an apparatus, like the apparatus 110 depicted in FIGS. 2-3, is shown. The output can be viewed on a display device, such as display device 124 shown in FIG. 2

FIG. 4 depicts an exemplary screen, generally designated by the numeral 200, for presenting a layered video feed 210. The layered video feed 210 can include video indicators, such as text boxes 212-216 and graphical indicator 218 that are embedded into the video by the edge device 128 shown in FIGS. 2-3.

The text box 212 indicates the time for a particular video frame. The text box 214 indicates the location at which a particular video frame is obtained. The text box 216 can include a label identifying the video feed. The graphical indicator 218 can indicate the position of a camera lens or a camera, such as sensor 136 shown in FIG. 2.

The edge device 128 can insert other types of visual indicators, such as bounding box 220, to highlight an area of interest, so that an operator will notice the area during an inspection operation. The bounding box 220 can identify and/or highlight objects 222, such as defects, roots, and/or other objects, that are of interest to the operator.

FIG. 5 depicts an exemplary screen, generally designated by the numeral 224, for presenting a graphic interface 226 having a video feed 228 from a device, such as sensing device 126 shown in FIG. 2. The video feed 228 can be captured by the edge device 128 shown in FIGS. 2-3 using the capture module 148 shown in FIG. 3. The graphic interface 226 can be displayed on the display device 124 shown in FIG. 2.

The graphic interface 226 can show the device details within box 230 and the device status within box 232. The graphic interface 226 can display inferences and related output on sensor measurement charts 234-238. The deep learning module 152 shown in FIG. 3 can obtain the inferences.

In this exemplary embodiment, each of the sensor measurement charts 234-238 can be based upon a different model of the process 112 shown in FIG. 2. The deep learning module 152 can develop different models from the same sensor output, so that you can obtain multiple models from the same video feed.

Referring to FIG. 6 with continuing reference to the foregoing figures, an exemplary method, generally designated by the numeral 300, for processing sensor data at the edge is shown. The method 300 can be a performed within the operating environment 100 shown in FIGS. 2-3 to produce output on screen 200 shown in FIG. 4 and/or screen 224 in FIG. 5.

At 301, a data stream is sent from at least one sensor to an edge device. In this exemplary embodiment, the sensor can be the sensor 136 shown in FIG. 2. The edge device can be the edge device 128 shown in FIGS. 2-3.

At 302, the data stream is stored within the edge device memory. In this exemplary embodiment, the edge device memory can be memory 142 shown in FIG. 3.

At 303, the data stream is modified in the edge device memory to compensate for defects contained therein, thereby forming a modified data stream. In this exemplary embodiment, the data stream can be modified with the pre-processing module 150 shown in FIG. 3.

At 304, inferences are identified within the modified data stream. In this exemplary embodiment, the inferences can be identified with the deep learning module 152 shown in FIG. 3.

At 305, a model can be trained based upon the inferences. In this exemplary embodiment, the model can be trained with the deep learning module 152 shown in FIG. 3.

At 306, the modified data stream, the model, and the inferences can be combined to form a processed data stream. In this exemplary embodiment, the processed data stream can be formed with the inference engine 144.

At 307, the processed data stream can be logged. In this exemplary embodiment, the processed data stream can be logged with the logging module 156 shown in FIG. 3.

At 308, the processed data stream is uploaded to a cloud computing system through a communication device connected to the edge device over a network. In this exemplary embodiment, the cloud computing system can be the cloud server 114 shown in FIG. 2. The communication device can be the communication device 130 shown in FIG. 2. The edge device can be the edge device 128 shown in FIGS. 2-3. The network can be the network 118 shown in FIG. 2.

Exemplary Cloud Architecture

Figure 7:
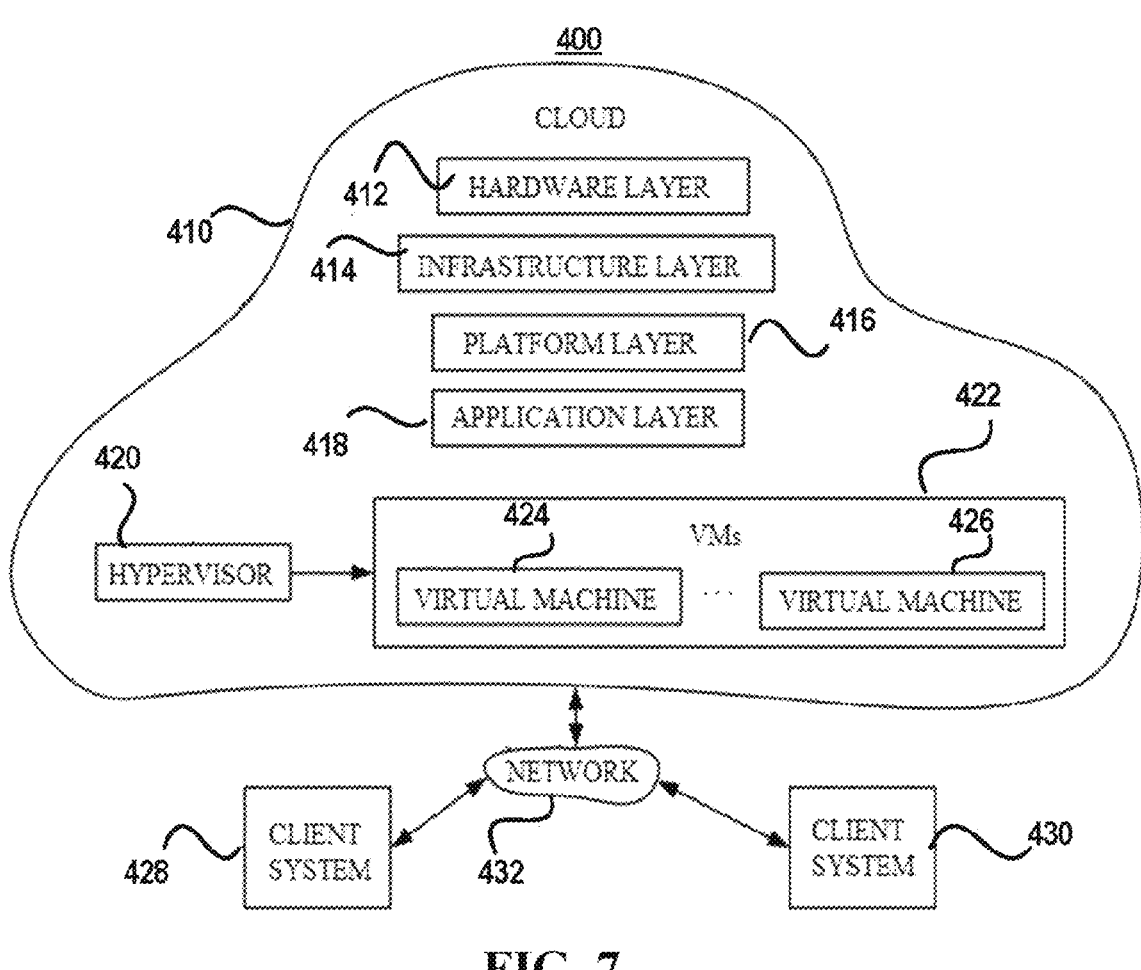
FIG. 7 illustrates an exemplary cloud computing system in accordance with this disclosure.

Referring to FIG. 7 with continuing reference to the foregoing figures, exemplary cloud architecture, generally designated by the numeral 400, for implementing the apparatus 110 shown in FIGS. 2-3 and/or performing the method 300 shown in FIG. 6.

The exemplary cloud architecture 400 provides computation, software, data access, and storage services that do not require end-user knowledge of the physical location or configuration of the system that delivers the services. In various embodiments, cloud computing delivers the services over a wide area network, such as the internet, using appropriate protocols.

For instance, cloud computing providers deliver applications over a wide area network and they can be accessed through a web browser or any other computing component. Software or components of architecture 400 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

As shown in FIG. 7, the cloud architecture 400 includes a cloud 410. The cloud 410 (or each of the different premises on the cloud 410) can include a hardware layer 412, an infrastructure layer 414, a platform layer 416, and an application layer 418.

A hypervisor 420 can illustratively manage or supervise a set of virtual machines 422 that can include a plurality of different, independent, virtual machines 424-426. Each virtual machine can illustratively be an isolated software container that has an operating system and an application inside it. It is illustratively decoupled from its host server by hypervisor 420. In addition, hypervisor 420 can spin up additional virtual machines or close virtual machines, based upon workload or other processing criteria.

A plurality of different client systems 428-430 (which can be end user systems or administrator systems, or both) can illustratively access cloud 410 over a network 432. Depending upon the type of service being used by each of the client systems 428-430, cloud 410 may provide different levels of service. In one example, the users of the client systems are provided access to application software and databases. The cloud service then manages the infrastructure and platforms that run the application. This can be referred to as software as a service (or SaaS). The software providers operate application software in application layer 418 and end users access the software through the different client systems 428-430.

The cloud provider can also use platform layer 416 to provide a platform as a service (PaaS). This involves an operating system, programming language execution environment, database and webserver being provided to the client systems 428-430, as a service, from the cloud provider. Application developers then normally develop and run software applications on that cloud platform and the cloud provider manages the underlying hardware and infrastructure and software layers. In this exemplary embodiment, the cloud provider is Google. The cloud infrastructure 400 is provided by the Google Cloud Platform.

The cloud provider can also use infrastructure layer 414 to provide infrastructure as a service (IaaS). In such a service, physical or virtual machines and other resources are provided by the cloud provider, as a service. These resources are provided, on-demand, by the IaaS cloud provider, from large pools installed in data centers. In order to deploy the applications, the cloud users that use IaaS install operating-system images and application software on the cloud infrastructure 400.

Exemplary Computer System

Figure 8:
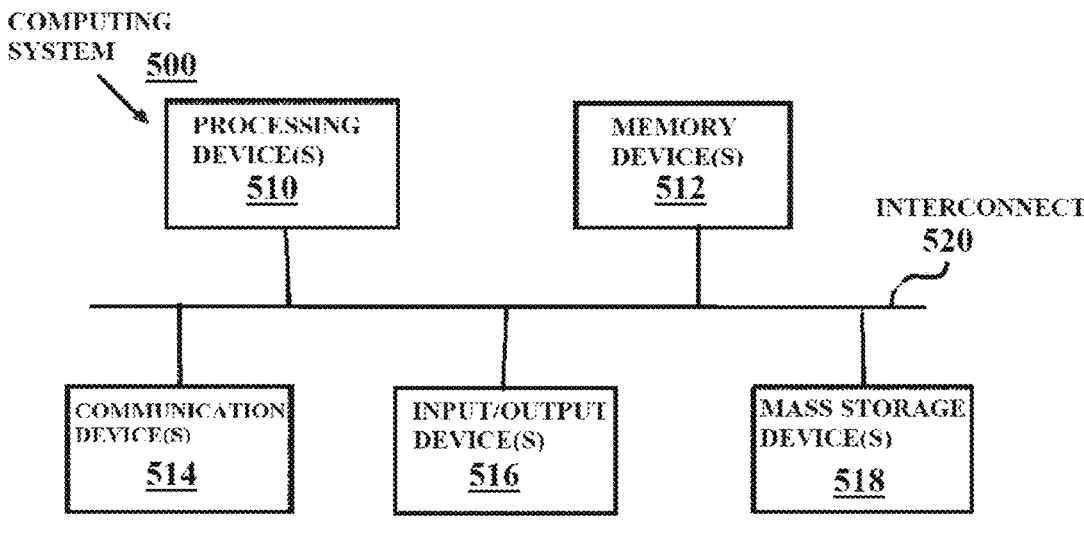
FIG. 8 illustrates a block diagram of a computing system operable to execute the disclosed systems and methods in accordance with this disclosure.

Referring now to FIG. 8 with continuing reference to the forgoing figures, a computer system for implementing an exemplary computing system, generally designated by the numeral 500, for use by the apparatus 110 shown in FIGS. 2-3.

The hardware architecture of the computing system 500 that can be used to implement any one or more of the functional components described herein. In some embodiments, one or multiple instances of the computing system 500 can be used to implement the techniques described herein, where multiple such instances can be coupled to each other via one or more networks.

The illustrated computing system 500 includes one or more processing devices 510, one or more memory devices 512, one or more communication devices 514, one or more input/output (I/O) devices 516, and one or more mass storage devices 518, all coupled to each other through an interconnect 520. The interconnect 520 can be or include one or more conductive traces, buses, point-to-point connections, controllers, adapters, and/or other conventional connection devices. Each of the processing devices 510 controls, at least in part, the overall operation of the processing of the computing system 500 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 512 can be or include one or more physical storage devices, which can be in the form of random access memory (RAM), read-only memory (ROM) (which can be erasable and programmable), flash memory, miniature hard disk drive, or other suitable type of storage device, or a combination of such devices. Each mass storage device 518 can be or include one or more hard drives, digital versatile disks (DVDs), flash memories, or the like. Each memory device 512 and/or mass storage device 518 can store (individually or collectively) data and instructions that configure the processing device(s) 510 to execute operations to implement the techniques described above.

Each communication device 514 can be or include, for example, an Ethernet adapter, cable modem, Wi-Fi adapter, cellular transceiver, baseband processor, Bluetooth or Bluetooth Low Energy (BLE) transceiver, serial communication device, or the like, or a combination thereof. Depending on the specific nature and purpose of the processing devices 510, each I/O device 516 can be or include a device such as a display (which can be a touch screen display), audio speaker, keyboard, mouse or other pointing device, microphone, camera, etc. Note, however, that such I/O devices 516 can be unnecessary if the processing device 510 is embodied solely as a server computer.

In the case of a client device, the communication devices(s) 514 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 514 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 512). A processor (e.g., processing device(s) 510) is "configured to execute a software program" when at least one value associated with the software program is stored in a register that is readable by the processor. In some embodiments, routines executed to implement the disclosed techniques can be implemented as part of OS software (e.g., MICROSOFT WINDOWS® and LINUX®) or a specific software application, algorithm component, program, object, module, or sequence of instructions referred to as "computer programs."

Computer programs typically comprise one or more instructions set at various times in various memory devices of a computing device, which, when read and executed by at least one processor (e.g., processing device(s) 510), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 512).

Supported Features and Embodiments

The detailed description provided above in connection with the appended drawings explicitly describes and supports various features of an edge computing initialization kit for use within an exemplary edge computing apparatus. By way of illustration and not limitation, supported embodiments an edge computing initialization kit for enabling the processing of sensor data comprising: a sensing device having at least one sensor; an edge device for receiving a data stream from the at least one sensor with the edge device having a processor and memory thereon; and a communication device for connecting the edge device to a cloud computing system over a network, so that the edge device can process the data stream and send the processed data stream to the cloud computing system; wherein the edge device memory includes instructions for execution by the edge device processor to deploy an inference engine using a pipeline having: a capture module for receiving the data stream and storing the data stream within the edge device memory; a pre-processing module for modifying the data stream in the edge device memory to compensate for defects contained therein, thereby forming a modified data stream; a deep learning module for identifying inferences within the modified data stream, for training a model based upon the inferences, and for combining the modified data stream, the model, and the inferences to form the processed data stream; and a logging module for storing the processed data stream.

Supported embodiments include the foregoing kit, further comprising: a network switch for connecting the edge device to the communication device.

Supported embodiments include any of the foregoing kits, wherein the at least one sensor is a camera having a lens.

Supported embodiments include any of the foregoing kits, wherein the camera is a camera selected from the group consisting of a security camera and a machine vision camera.

Supported embodiments include any of the foregoing kits, wherein the capture module receives the data stream indirectly from the at least one sensor.

Supported embodiments include any of the foregoing kits, wherein the pipeline includes a customization module for adding at least one data layer to the data stream.

Supported embodiments include any of the foregoing kits, wherein the deep learning module utilizes augmentation to identify inferences within the modified data stream and to train the model.

Supported embodiments include any of the foregoing kits, wherein the deep learning module utilizes segmentation to identify inferences within the modified data stream and to train the model.

Supported embodiments include any of the foregoing kits, wherein the edge device sends output relating to the modified data stream to a visualization hub residing on the cloud computing system.

Supported embodiments include any of the foregoing kits, wherein the output includes inferences.

Supported embodiments include an edge computing apparatus for enabling the processing of sensor data comprising: a sensing device having at least one sensor; an edge device coupled to the sensing device to receive a data stream from the at least one sensor with the edge device having a processor and memory thereon; a communication device connected to the edge device; and a cloud computing system connected to the communication device over a network; wherein the edge device memory includes instructions for execution by the edge device processor to deploy an inference engine using a pipeline; and wherein the edge device inference engine pipeline converts data stream into processed data stream to send to the cloud computing system utilizing: a capture module for storing the data stream within the edge device memory after the data stream is received from the at least one sensor; a pre-processing module for modifying the data stream in the edge device memory to compensate for defects contained therein, thereby forming a modified data stream; a deep learning module for identifying inferences within the modified data stream, for training a model based upon the inferences, and for combining the modified data stream, the model, and the inferences to form the processed data stream; and a logging module for storing the processed data stream.

Supported embodiments include the foregoing apparatus, further comprising: a network switch for connecting the edge device to the communication device.

Supported embodiments include any of the foregoing apparatus, wherein the at least one sensor is a camera having a lens.

Supported embodiments include any of the foregoing apparatus, wherein the camera is a camera selected from the group consisting of a security camera and a machine vision camera.

Supported embodiments include any of the foregoing apparatus, wherein the capture module receives the data stream indirectly from the at least one sensor.

Supported embodiments include any of the foregoing apparatus, wherein the pipeline includes a customization module for adding at least one data layer to the data stream.

Supported embodiments include any of the foregoing apparatus, wherein the deep learning module utilizes augmentation to identify inferences within the modified data stream and to train the model.

Supported embodiments include any of the foregoing apparatus, wherein the deep learning module utilizes segmentation to identify inferences within the modified data stream and to train the model.

Supported embodiments include any of the foregoing apparatus, wherein the capture module utilizes augmentation to identify inferences within the modified data stream and to train the model.

Supported embodiments include any of the foregoing apparatus, wherein the deep learning module utilizes segmentation to identify inferences within the modified data stream and to train the model.

Supported embodiments include any of the foregoing apparatus, wherein the cloud computing system includes a visualization hub for viewing output related to the processed data stream.

Supported embodiments include a method for processing of sensor data at the edge comprising: sending a data stream from at least one sensor to an edge device; storing the data stream within the edge device memory; modifying the data stream in the edge device memory to compensate for defects contained therein, thereby forming a modified data stream; identifying inferences within the modified data stream; training a model based upon the inferences; combining the modified data stream, the model, and the inferences to form a processed data stream; logging module the processed data stream; and uploading the processed data stream to a cloud computing system through a communication device connected to the edge device over a network.

Supported embodiments include a device, a system, a computer-readable storage medium, a computer program product and/or means for implementing any of the foregoing kits, apparatus, methods, or portions thereof.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An edge computing initialization kit for enabling the processing of sensor data comprising:
   a sensing device having at least one sensor;
   an edge device for receiving a data stream from the at least one sensor with the edge device having a processor and memory thereon; and
   a communication device for connecting the edge device to a cloud computing system over a network, so that the edge device can process the data stream and send the processed data stream to the cloud computing system;
   wherein the edge device memory includes instructions for execution by the edge device processor to deploy an inference engine using a pipeline having:
   a capture module for receiving the data stream and storing the data stream within the edge device memory;

a pre-processing module for modifying the data stream in the edge device memory to compensate for defects contained therein, thereby forming a modified data stream;

a deep learning module for identifying inferences within the modified data stream, for training a model based upon the inferences, and for combining the modified data stream, the model, and the inferences to form the processed data stream; and a logging module for storing the processed data stream.

2. The edge computing initialization kit of claim 1, further comprising:

a network switch for connecting the edge device to the communication device.

3. The edge computing initialization kit of claim 1, wherein the at least one sensor is a camera having a lens.

4. The edge computing initialization kit of claim 3, wherein the camera is a camera selected from the group consisting of a security camera and a machine vision camera.

5. The edge computing initialization kit of claim 1, wherein the capture module receives the data stream indirectly from the at least one sensor.

6. The edge computing initialization kit of claim 1, wherein the pipeline includes a customization module for adding at least one data layer to the data stream.

7. The edge computing initialization kit of claim 1, wherein the deep learning module utilizes augmentation to identify inferences within the modified data stream and to train the model.

8. The edge computing initialization kit of claim 1, wherein the deep learning module utilizes segmentation to identify inferences within the modified data stream and to train the model.

9. The edge computing initialization kit of claim 1, wherein the edge device sends output relating to the modified data stream to a visualization hub residing on the cloud computing system.

10. The edge computing initialization kit of claim 1, wherein the output includes inferences.

11. An edge computing apparatus for enabling the processing of sensor data comprising:

a sensing device having at least one sensor;

an edge device coupled to the sensing device to receive a data stream from the at least one sensor with the edge device having a processor and memory thereon;

a communication device connected to the edge device; and a cloud computing system connected to the communication device over a network;

wherein the edge device memory includes instructions for execution by the edge device processor to deploy an inference engine using a pipeline; and wherein the edge device inference engine pipeline converts data stream into processed data stream to send to the cloud computing system utilizing:

a capture module for storing the data stream within the edge device memory after the data stream is received from the at least one sensor;

a pre-processing module for modifying the data stream in the edge device memory to compensate for defects contained therein, thereby forming a modified data stream;

a deep learning module for identifying inferences within the modified data stream, for training a model based upon the inferences, and for combining the modified data stream, the model, and the inferences to form the processed data stream; and a logging module for storing the processed data stream.

12. The edge computing apparatus of claim 11, further comprising:

a network switch for connecting the edge device to the communication device.

13. The edge computing apparatus of claim 11, wherein the at least one sensor is a camera having a lens.

14. The edge computing apparatus of claim 13, wherein the camera is a camera selected from the group consisting of a security camera and a machine vision camera.

15. The edge computing apparatus of claim 11, wherein the capture module receives the data stream indirectly from the at least one sensor.

16. The edge computing apparatus of claim 11, wherein the pipeline includes a customization module for adding at least one data layer to the data stream.

17. The edge computing apparatus of claim 11, wherein at least one of the deep learning module and the capture module utilizes augmentation to identify inferences within the modified data stream and to train the model.

18. The edge computing apparatus of claim 11, wherein at least one of the deep learning module and the capture module utilizes segmentation to identify inferences within the modified data stream and to train the model.

19. The edge computing apparatus of claim 11, wherein the cloud computing system includes a visualization hub for viewing output related to the processed data stream.

20. A method for processing of sensor data at the edge comprising:

sending a data stream from at least one sensor to an edge device;

storing the data stream within the edge device memory;

modifying the data stream in the edge device memory to compensate for defects contained therein, thereby forming a modified data stream;

identifying inferences within the modified data stream;

training a model based upon the inferences;

combining the modified data stream, the model, and the inferences to form a processed data stream;

logging the processed data stream; and uploading the processed data stream to a cloud computing system through a communication device connected to the edge device over a network.

* * * * *